United States Patent [19]
Kodama et al.

[11] Patent Number: 5,698,845
[45] Date of Patent: Dec. 16, 1997

[54] OPTICAL DETECTION APPARATUS FOR DETECTING LIGHT INTERRUPTION

[75] Inventors: Tomoaki Kodama, Hadano; Kazuyoshi Hibiya, Odawara, both of Japan

[73] Assignee: Stanley Electric Co., Ltd., Tokyo, Japan

[21] Appl. No.: 636,394

[22] Filed: Apr. 23, 1996

[30] Foreign Application Priority Data

May 23, 1995 [JP] Japan ................... 7-123713

[51] Int. Cl.$^6$ ........................ G02F 1/00
[52] U.S. Cl. ........................ 250/221; 250/214 B
[58] Field of Search .............. 356/375; 250/221, 250/221.1, 214 B

[56] References Cited

U.S. PATENT DOCUMENTS 5,164,714  11/1992  Wehrer ................... 250/221
5,179,369   1/1993  Person et al. ........... 250/221

*Primary Examiner*—F. L. Evans
*Attorney, Agent, or Firm*—W. Squire

[57] ABSTRACT

The light selected by a selection circuit 3 at a light emitting side and emitted from a light emitting element 1 such as a LED is converted to a specifically modulated light by an oscillation circuit 11. The light received by a light receiving element 2 such as a phototransistor at the receiving side is amplified by an amplifier circuit 6, and a detection circuit 12 detects whether a specifically modulated light is received. The H/L detection circuit 13 determines the presence/absence of a light interruption to produce a signal of either H (high level) or L (low level). Also, the signal from the oscillator 11 of the emission side is received by the receiving side and compared with the received signal to determine whether the same signal as emitted from the emitting element has been actually received.

6 Claims, 7 Drawing Sheets

OPTICAL DETECTION APPARATUS FOR DETECTING LIGHT INTERRUPTION

BACKGROUND OF THE INVENTION

1. Field of the Invention

The present invention relates to an apparatus and the method thereof for optically detecting the presence of an obstacle or suspension of light using a light emitting element and a light receiving element.

2. Brief Description of the Prior Art

FIG. 9 shows a circuit block diagram of a conventional photo-detecting apparatus utilizing a touch panel, comprising a plurality of light emitting elements 1 such as LEDs and a plurality of light receiving elements 2 such as phototransistors or photodiodes. These elements 1 and 2 are arranged in opposed relationship to each other, and are selected respectively by selector circuits 3 and 4.

In FIG. 9, there are shown a driving circuit for driving a touch panel, an amplifier circuit 6 for amplifying the output voltage of receiving circuit 2, and a threshold (SH) level detecting circuit 7 for comparing the output voltage of amplifier circuit 6 with a predetermined value.

In general, in an optical touch panel, a number of light emitting elements 1 and light receiving elements 2 are arranged so as to oppositely face to each other. When no obstacle, that is, a light interrupting object, is present between the emitting element and receiving element, a large amount of current flows from the receiving element 2 with an increased quantity of light received by the receiving element 2, while, when an obstacle is present, only a small amount of current flows with a decreased quantity of light received by the light receiving element 2. Accordingly, by comparing the output level of light receiving element 2 with a predetermined value, it is possible to detect the presence of an obstacle between light emitting element 1 and light receiving element 2.

The output light from the light emitting element 1 selected by the selection circuit 3 is received by the light receiving element 2, and the received current is amplified by amplifying circuit 6 to be converted to a d.c.(direct current) level current, which is compared with the predetermined threshold level to generate a H/L signal of either H (high level) or L (low level) according to whether higher or lower than the threshold level to inform the existence of an obstacle.

FIG. 10 denotes a block diagram of another conventional example, in which the same arrangement is shown by the same symbol as that shown in FIG. 9. The detecting device in FIG. 9 is of threshold detection type, while that shown in FIG. 10 is of numerical detection type.

More specifically, the d.c. level voltage converted by the amplifier circuit 6 is numerically represented by an A/D (analog/digital) converter circuit 8 to be compared with a predetermined value by a H/L detection circuit 9, thereby enabling detection of a light interrupting object between the emitting and receiving elements 1 and 2.

However, there have been disadvantages in the conventional photo-detecting apparatus and method therefor, such as including the aged deterioration of emitting and receiving elements, external noises, positional defects of the optical axis due to dispersion of optical parts and packaging forms, or the change of received quantity of light. Therefore, the problem is that the threshold level or numerical values for determining whether the light is interrupted cannot be definitely fixed, and the setting thereof is fairly complicated because the numerical values mentioned above should be inevitably based on the existing hardware and software.

The present invention has been made in view of the above disadvantages, and the object thereof is to provide an optical detection apparatus and a method therefor, which is free from the aged deterioration, external disturbances, and also requires no corrections for dispersion of optical components and vertical and lateral distance differences, and properly determining whether the light is interrupted or enabled to transmit.

SUMMARY OF THE INVENTION

The optical detection apparatus of the invention comprises a light emitting element; a modulation circuit for modulating so that a specifically modulated light is emitted from the light emitting element; a light receiving element for receiving the modulated light; and a demodulation circuit for detecting the received light, wherein the presence of a light interruption is determined on the basis of the output of the demodulation circuit. In addition, the modulation circuit allows the emitting element to produce a light having a frequency higher than twice that of the commercial alternating power supply.

Also, the apparatus of the invention comprises a light emitting element; an oscillator circuit for allowing the light emitting element to emit a predetermined light signal; a light receiving element for receiving the light signal; and sensor means for comparing the output signal of the light receiving element and the output signal of the oscillator circuit for determining the presence of a light interruption between the light emitting element and the light receiving element. In addition, the sensor means mentioned above comprises a synchronizing circuit for synchronizing an output signal of the oscillator circuit with an output signal of the light receiving element; and a detection circuit for comparing the synchronized output signals.

A method of optical detection of the invention comprises the steps of: emitting a specifically modulated light from a light emitting element; detecting the output of a light receiving element which is adapted to receive the modulated light to detect the presence of the modulated light; and from the result above, determining the of light interruption between the light emitting element and the light receiving element. Also, preferably the light emitting element is allowed to emit a modulated light modulated by a frequency higher than twice that of the commercial alternating power supply.

DETAILED DESCRIPTION OF THE INVENTION

Figure 1:
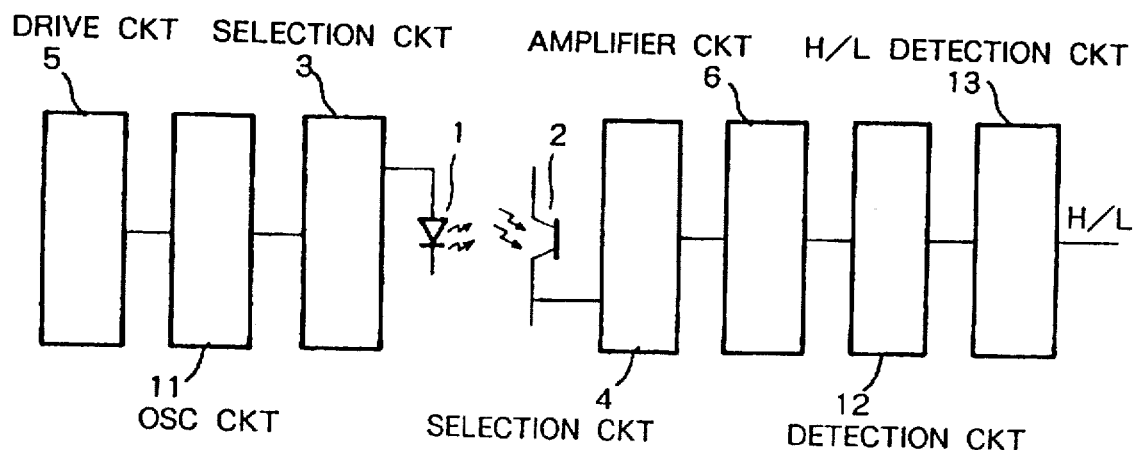
FIG. 1 is a block diagram of an embodiment of the invention.
Figure 9:
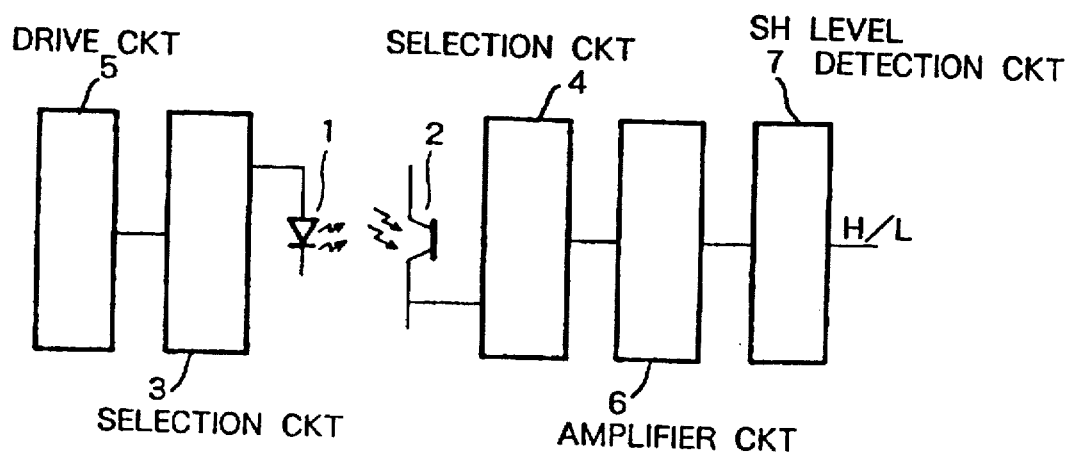
FIG. 9 is a block diagram of a conventional embodiment.
Figure 10:
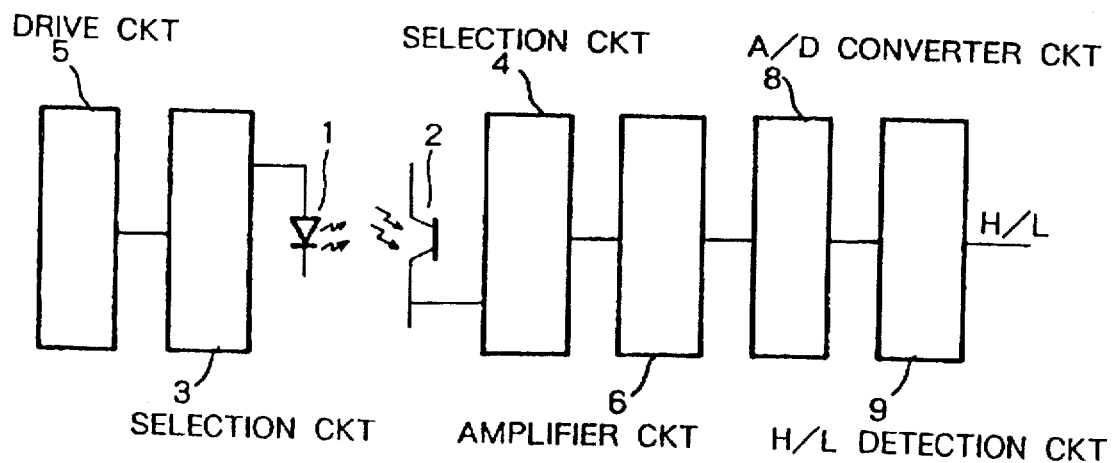
FIG. 10 is a block diagram of another conventional embodiment.

FIG. 1 is a circuit diagram of an optically detecting apparatus, in which the same symbol as that in FIGS. 9 and 10 denotes the same or corresponding portion for ease of comprehension.

This detection apparatus has the same scheme as that shown in FIGS. 9 and 10 such that a plurality of light emitting and receiving elements are arranged so as to oppositely face to each other, and the light emitting and receiving elements are selected by the selection circuits 3 and 4, respectively.

From light emitting element 1, a specifically modulated light is emitted, which is modulated by an oscillation circuit (or modulation circuit) 11, the output of light receiving element 2 which receives the modulated light is amplified by an amplifier circuit 6, and then detected by a detection circuit (demodulation circuit) 12. A H/L detecting circuit 13 is adapted to determine the presence/absence of a light interruption between light emitting element 1 and light receiving element 2 to produce a H/L signal.

In addition, the modulation frequency of the light generated from the element 1 is in advance set, by the oscillation circuit, so as to be more than twice the commercial alternating line frequency.

In operation, the detection apparatus in FIG. 1 is, same as the conventional example, the light from light emitting element 1 is received by light receiving element 2, and any light interruption therein is determined. However, separate apart from any of the types of threshold level detection in FIG. 9 or of numerical detection in FIG. 10, the apparatus of the invention is of the type of modulated light detection, wherein the change of not d.c. level but of a.c. (alternating current) level is detected.

Figure 2A:
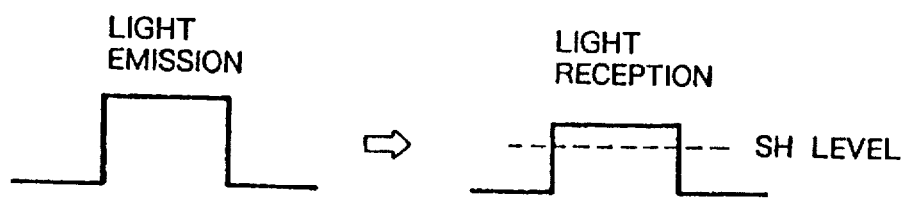
FIG. 2a illustrates square wave pulse signals for a conventional light interruption circuit.
Figure 2B:
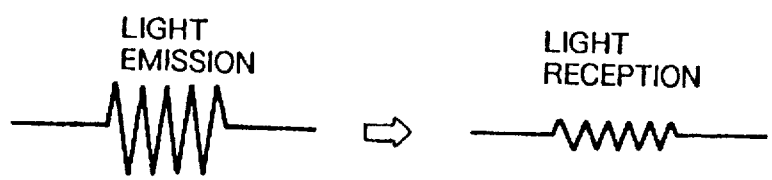
FIG. 2b illustrates modulated pulse signals for a light interruption circuit according to an embodiment of the present invention.

Conventionally in FIG. 2(a), the output level of light receiving element 2 is converted to a d.c. level voltage and compared with the threshold (SH) level, in order to enable determination of presence/absence of a light interruption between the light emitting and receiving elements 1 and 2. On the contrary, in the present embodiment of the invention, the received light current is converted to an a.c. level voltage and demodulated, as shown in FIG. 2(b), to determine the presence of a light interruption.

As shown in the drawings, the current modulated and biased by the oscillation circuit is let flow into the emitting element 1, and the modulated light produced from the emitting element 1 is received by the light receiving element 2. In the light receiving port, the light receiving current is converted to an a.c. leveled voltage by amplifier circuit 6, and detected whether the light having a specifically modulated waveform has been received by the detection circuit 12. In addition, a H/L detection circuit 13 determines a light interruption between the light emitting element 1 and receiving element 2 to produce a H/L signal.

As discussed above, not relying upon the d.c. level of the received light current, but through detection of the change in a.c. level to identify the light interruption: therefore, without need of considering the threshold level, any influence of the d.c. level by the external disturbance or the like is cancelled and also without affected by the influences of the received light level.

Accordingly, there is only a few influence by the aged deterioration of optical components, such as light emitting elements 1 and receiving elements 2, or any external noises, and no correction is necessary against deviation of the optical axis due to dispersion of packaging conditions of optical components or against difference of vertical and lateral directions.

As previously discussed, since the frequency is twice that of the commercial alternating line source, the embodiment of the invention is free from the frequency alteration due to the external disturbance or the effect of fluorescent lamps.

Figure 3:
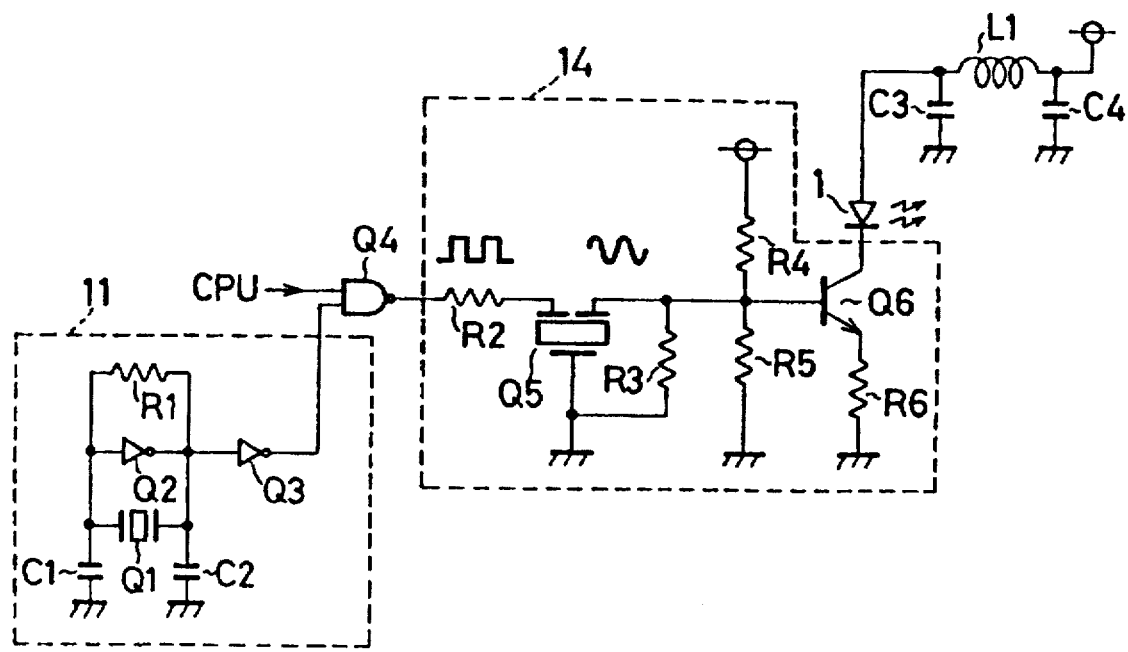
FIG. 3 is a detailed circuit diagram of a light emitting device according to a first embodiment.

FIG. 3 is a detailed illustration of the circuit of a light emitting device having the oscillator circuit 11 above. The oscillator 11 includes a quartz crystal oscillator Q1, a resistor R1, capacitors C1 and C2, and inverters Q2 and Q3, and the output thereof is applied to an amplifier circuit 14 of the latter stage via a NAND circuit Q4, to which NAND a control signal from the CPU, which has not been illustrated at the description of the detection step, is also applied.

The amplifies 14 above includes a ceramic filter Q5 and a transistor Q6 connected in series to the light emitting element 1, and converts the square waveform signal applied from the oscillator 11 to a signal having a normal a.c. waveform. As shown in FIG. 3, resistors R2 to R6 are also included. The emitting elements are supplied with a driving current through a smoothing circuit including an inductor L1 and capacitors C3 and C4.

Figure 4:
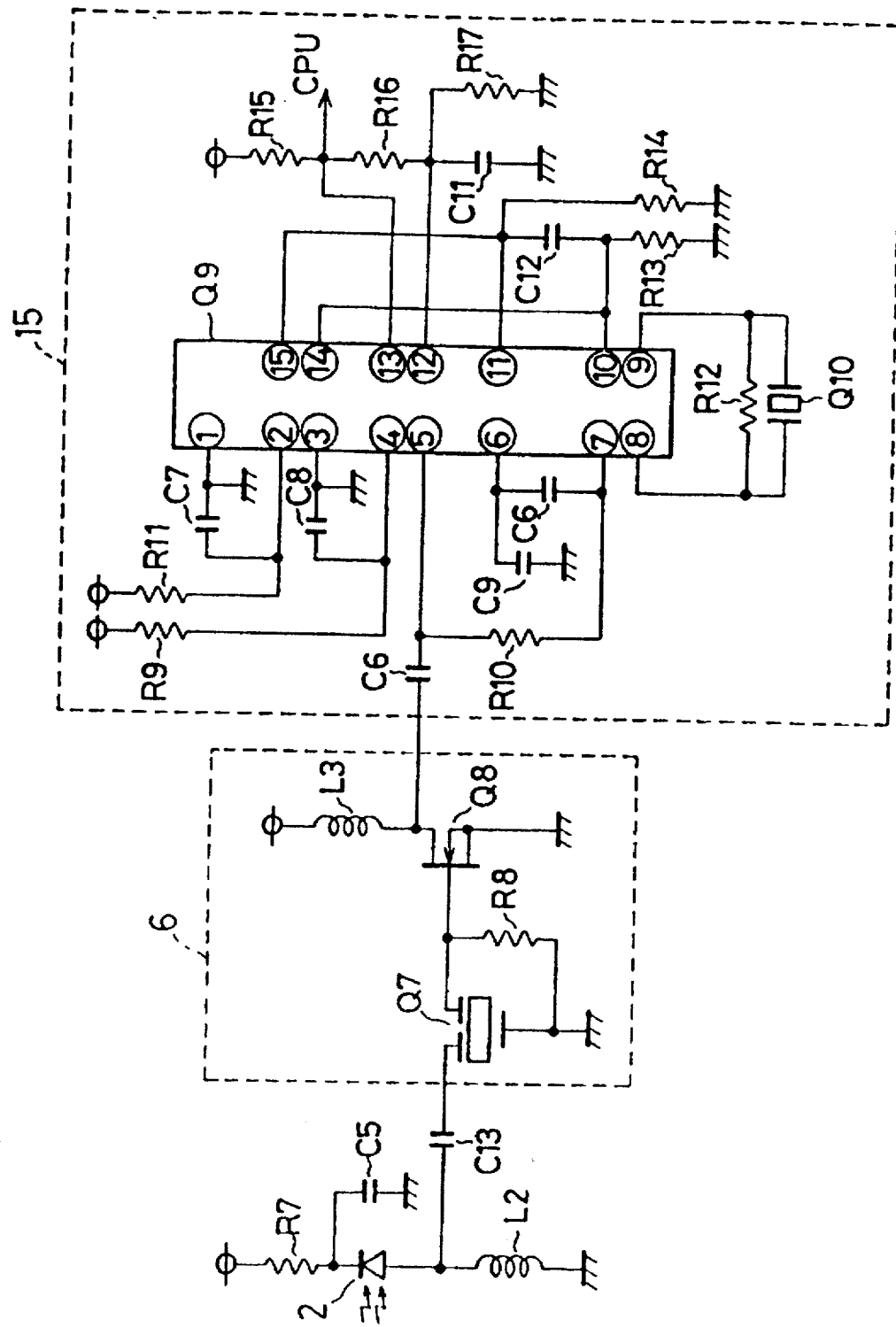
FIG. 4 is a detailed circuit diagram of a light receiving device of the first embodiment.

FIG. 4 is a detailed illustration of an example of a light receiving device having a photo-diode as a light receiving element 2, to which is connected in series a resistor R7 and an inductor L2, and in parallel therewith a capacitor C5 is connected. The output of receiving element 2 is applied to an amplifier circuit 6 via a capacitor C13.

The amplifier 6, the same as amplifier 14 in FIG. 3, includes a ceramic filter Q7 and a transistor Q8, and the output thereof is applied to a demodulation, H/L detection circuit 15 of the latter stage, which H/L detection circuit 15 is of a combined form including detection circuit 12 and H/L detection circuit 13 in FIG. 1. The amplifier 6 also includes a resistor R8 and an inductor L3.

Figure 5:
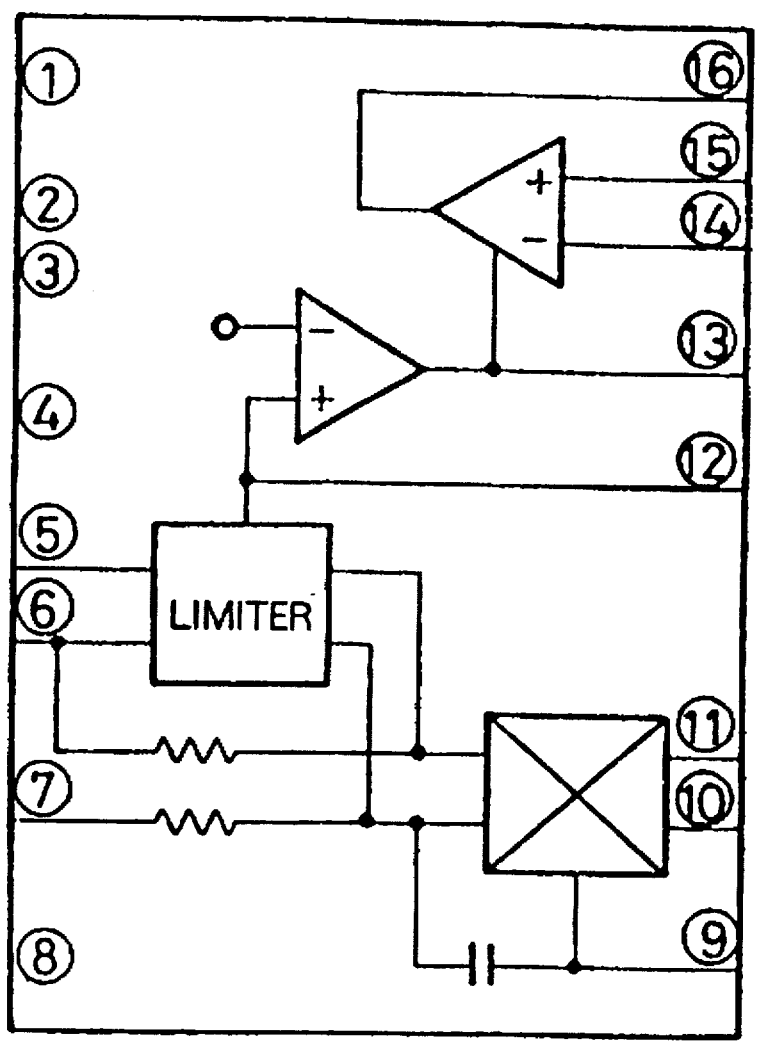
FIG. 5 is a summary construction of a wide-range FSK receiver.

The afore-mentioned H/L detection circuit 15 may be constructed using e.g. a wide-range FSK receiver Q9, which is a device (MC 13055) manufactured by Motorola Corporation. FIG. 5 is a summary construction of the FSK receiver Q9, which is of a block scheme, including an operational amplifier, a limiter and an amplifier, and more specifically, including a quadrature detector, a signal strength detector and a data re-shaping component.

The H/L detection circuit 15 also includes resistors R9–R17, capacitors C6–C12, and a DIS Q10, the detection output of which circuit 15 is applied to the afore-mentioned CPU.

Figure 6:
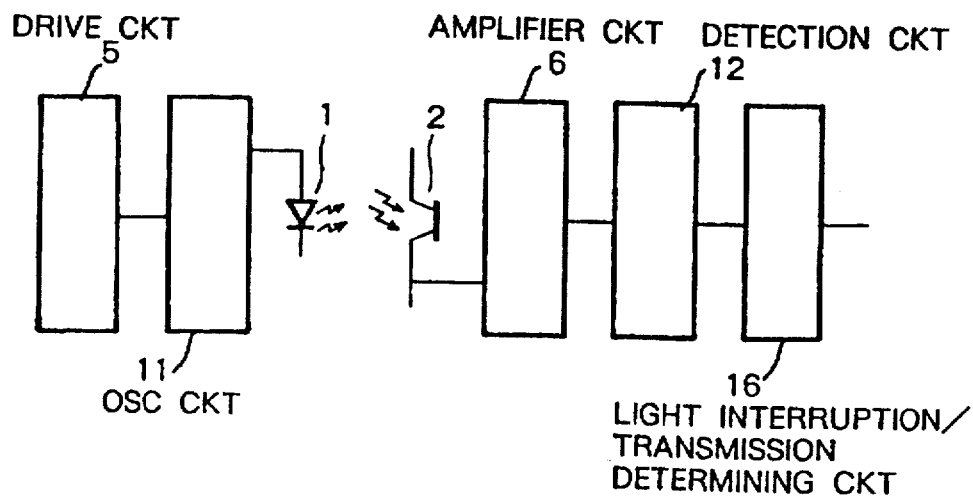
FIG. 6 is a block diagram of the first embodiment in FIG. 3.

The above embodiment is fundamentally illustrated as the circuit shown by FIG. 6, wherein the drive circuit 5 drives oscillator circuit 11 to cause the light emitting element 1 to produce a pulsed light or a modulated light, which light is detected in the detection circuit 12 as to whether it has been received by light receiving element 2. The light interruption or transmission is determined by the light interruption/ transmission determining circuit 16 (which corresponds to H/L detection circuit 13), wherein the manner of such determination is performed through the process of detecting the pulse width or pulse number of the emitted light or determining the modulated frequency is the same or not.

However, it is not always possible to avoid erroneous determination even by the afore-mentioned circuitry. One case is that, nevertheless the light emitting element 1 emits no light, when an incident signal, which is similar to that to be emitted by light emitting element 1, is received, sometimes the detection circuit 12 can mis-determine as a correctly emitted light to effect an erroneous determination of light interruption/transmission. Also, in another case, when light emitting element 1 actually emits light but, even though the light path is in the interrupted state by an obstacle, a similar external pulsed light or modulated light can be received and mis-determined as if the light is transmitted in spite of actually being interrupted.

Figure 7:
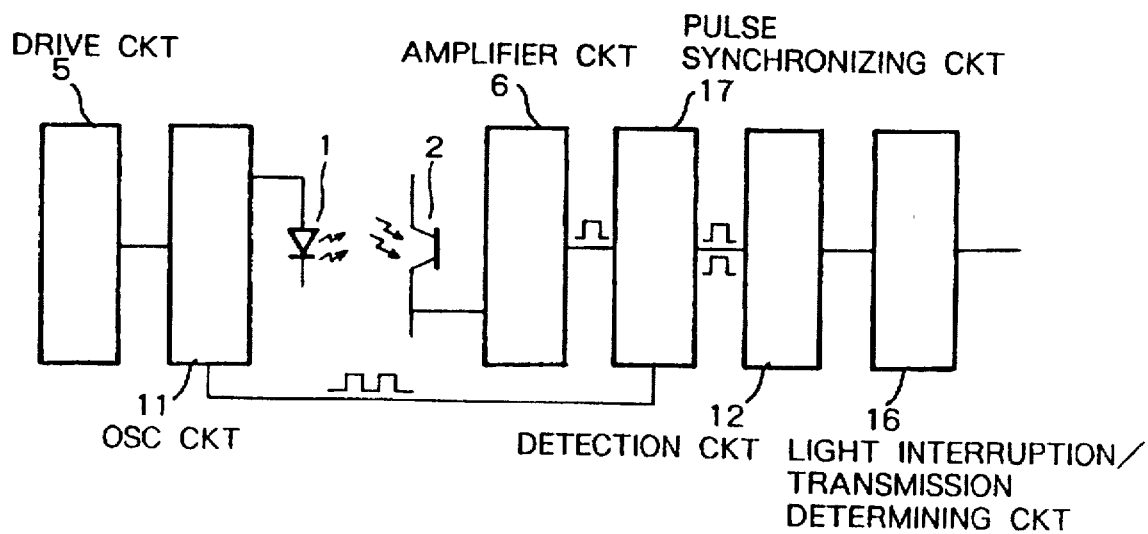
FIG. 7 is a block diagram according to a second embodiment.

FIG. 7 shows a block diagram of the second embodiment for preventing the above-mentioned disadvantage, in which the same numerical references are used as in FIG. 6, and a pulse synchronizing circuit 17 is to synchronize an output signal of a resonance circuit 11 with an output signal of light receiving element 2, and a detection circuit 12 is to compare and detect the sychronized signals.

For illustrating the case of the transmission/reception of pulsed light, the detection circuitry is shown as comprising a pulse synchronizing circuit 17, a detection circuit 12 and a determining circuit 16, for comparing both the output signals, and determining whether the interruption/transmission of light is effected.

More specifically, the embodiment is featured in that the oscillation signal used for light emission at the emission means is received by the receiving means and further synchronized with the received light signal. In this manner, it is possible to determine as to whether the same signal or different signal has been received, or any external, foreign signal can be received, thereby any malfunction caused by any external disturbance being prevented to result in a proper determination of interruption/transmission of light.

Figure 8:
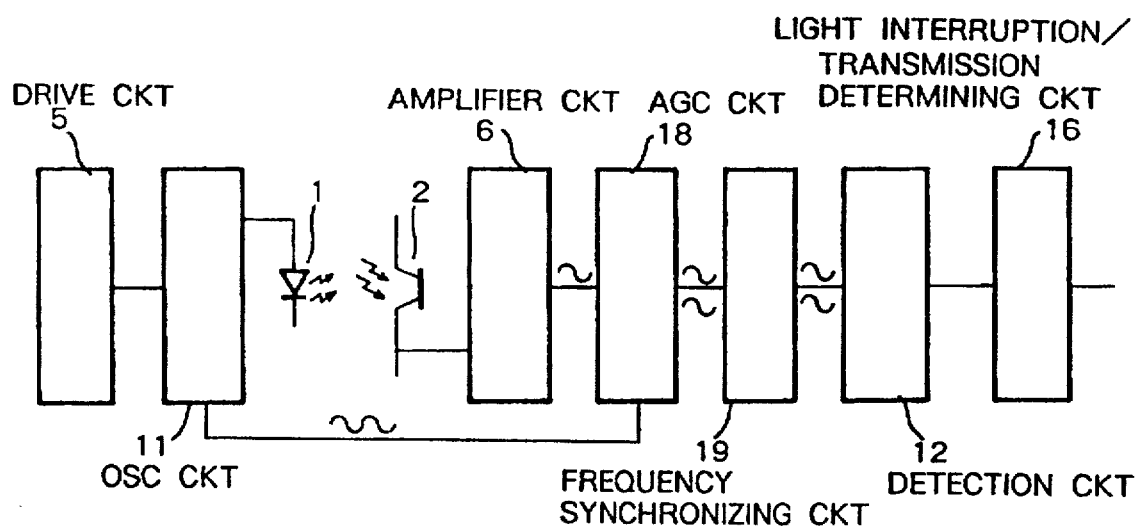
FIG. 8 is a block diagram according to a third embodiment.

In a third embodiment shown as a block diagram in FIG. 8, having an AGC (Automatic gain control) circuit 18 and a frequency cynchronizing circuit 19, together with detection circuit 12 and a light interruption/transmission determining circuit, thus forming an entire sensing circuitry for determining interruption/transmission of light.

The third embodiment relates to the case of transmission and reception of a modulated light, wherein the output signal of light receiving element 2 is formed in a same gain with the emitted frequency by means of AGC circuit, then the signal waveform of both signals are synchronized with each other by the frequency cynchronizing circuit 19, and compared by the detection circuit 12, thereby whether the actually emitted light have been received being determined.

By either circuit arrangements, the correct determination for interruption/transmission of light is enabled.

In the case of separate signal form, using a separate signal sources at the light emitting and receiving circuits, there can be a minute deviation between the emission side and recognition at receiving side.

In view of the above, the second and third embodiments can eliminate the above-described disadvantage, as the oscillation signal itself is also used for recognition of the received light or signal comparison.

More precisely, the same oscillation is used at the emission and reception of light. As a result, recognition is eased, when an foreign light is erroneously received, and, when processing a pulsed light or modulated light, distinction is enabled, in case that a different light is received.

In summary, the invention includes the emission of a specifically modulated light from a light emitting element, and detection of the presence of the modulated light from the output of a light receiving element, thereby determining whether there is light interruption/transmission.

The present invention has been made in view of the above disadvantages, and the object thereof is to provide an optical detection apparatus and a method therefor, which is free from the aged deterioration, external disturbances, and also requires no corrections for dispersion of optical components and vertical and lateral distance differences.

In addition, any influence caused by any external disturbant light having a resembled nature is prevented to achieve correct determination between light interruption and transmission, because the determination is performed by comparing the signals of both emitted and received.

What is claimed is:

1. An optical detection apparatus for detecting light interruption comprising;

a light emitting element;

a modulation circuit having an output for causing said light emitting element to emit a modulated light output signal comprising a first plurality of pulses of a given first modulation waveform;

a light receiving element for receiving said modulated light output signal and for producing an output in response to said received modulated light output signal, said element output comprising a second plurality of pulses having a second given modulation waveform corresponding to the first modulation waveform of said first plurality of pulses;

a detection circuit for detecting the outputs of said modulation circuit and the light receiving element including means for determining the correspondence of the light output signal to that of the element output and for producing a further output signal having a first value manifesting the presence of said received modulated light and a second value different than the first value manifesting interruption of said received light;

wherein the presence of a light interruption between said light emitting element and said light receiving element is determined on the basis of the value of the output signal of the detection circuit.

2. An optical detection apparatus according to claim 1, wherein said modulation circuit includes means for causing said light emitting element to emit a modulated light modulated by a frequency higher than twice that of a commercial alternating current voltage supply.

3. An optical detection apparatus comprising;

a light emitting element;

an oscillator circuit for generating an output signal comprising a first plurality of pulses of a first frequency and pulse width and for causing said light emitting element to emit a light signal manifesting said output signal;

a light receiving element for receiving and responsive to said light signal for producing a further output signal corresponding to the oscillator circuit output signal; and sensor means for comparing the further output signal of said light receiving element and of the output signal of said oscillator circuit for determining the presence of a light interruption between said light emitting element and said light receiving element.

4. An optical detection apparatus according to claim 3, wherein said sensor means comprising:

a synchronizing circuit for synchronizing the output signal of said oscillator circuit with an output signal of said light receiving element; and a detection circuit for comparing said synchronized output signals.

5. A method of optical detection comprising:

emitting modulated light from a light emitting element, said emitted light being generated from a given first modulated waveform output signal comprising a first plurality of pulses having a pulse width and frequency;

receiving the emitted modulated light with a light receiving element and generating from the received light a further modulated waveform output signal comprising a further plurality of pulses having a second pulse width and frequency;

comparing the first and further modulated waveform output siqnals correspondinq to said emitted light and received light; and from the comparing, determining the presence of light interruption between said light emitting element and said light receiving element.

6. A method according to claim 5, wherein said light emitting step includes emitting a modulated light modulated by a frequency higher than that of a commercial alternating power supply.

* * * * *